(12) United States Patent
Takabayashi et al.

(10) Patent No.: US 7,710,622 B2
(45) Date of Patent: May 4, 2010

(54) COLOR HOLOGRAM DISPLAY AND ITS FABRICATION PROCESS

(75) Inventors: Emi Takabayashi, Tokyo (JP); Daijiro Kodoma, Tokyo (JP); Masachika Watanabe, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 11/285,950

(22) Filed: Nov. 23, 2005

(65) Prior Publication Data

US 2006/0072178 A1    Apr. 6, 2006

Related U.S. Application Data

(63) Continuation of application No. 09/547,663, filed on Apr. 12, 2000, now Pat. No. 7,154,647.

(30) Foreign Application Priority Data

Apr. 12, 1999   (JP) .................................. 11-104086
Jan. 13, 2000   (JP) ............................. 2000-004617

(51) Int. Cl.
*G03H 1/20*   (2006.01)
*G03H 1/00*   (2006.01)

(52) U.S. Cl. ............................... 359/12; 359/15; 359/24

(58) Field of Classification Search .................... 359/24, 359/28, 30, 12, 22, 25, 2, 15; 283/86; 430/1
See application file for complete search history.

(56) References Cited

U.S. PATENT DOCUMENTS

| | | | |
|---|---|---|---|
| 4,888,260 A | 12/1989 | Cowan | 430/1 |
| 4,999,234 A * | 3/1991 | Cowan | 428/156 |
| 5,499,116 A * | 3/1996 | Wreede et al. | 359/2 |
| 5,499,118 A | 3/1996 | Wreede et al. | 359/12 |
| 5,956,164 A | 9/1999 | Waitts | 359/2 |
| 6,052,209 A | 4/2000 | Nishikawa | 359/22 |
| 6,097,514 A | 8/2000 | Nishikawa | 359/12 |
| 6,667,819 B2 * | 12/2003 | Nishikawa et al. | 359/15 |
| 2001/0053004 A1 | 12/2001 | Nishikawa et al. | 359/15 |

FOREIGN PATENT DOCUMENTS

| | | |
|---|---|---|
| EP | 0701183 | 3/1996 |
| EP | 0754987 | 1/1997 |
| WO | 92/16880 A | 10/1992 |

* cited by examiner

*Primary Examiner*—Audrey Y Chang
(74) *Attorney, Agent, or Firm*—Patenttm.us

(57) ABSTRACT

The invention relates to a color hologram display an image of a three-dimensional object and a hologram image of a pattern of plane characters, images or the like are recorded in the same volume type hologram photosensitive material in a superposed or multiplexed fashion. A color hologram display 27' comprising a combined reflection and volume type of single layer, wherein a color pattern 29g of plane characters, images or the like and a color three-dimensional subject image O" are reconstructably recorded while spatially superposed one upon another.

15 Claims, 6 Drawing Sheets

COLOR HOLOGRAM DISPLAY AND ITS FABRICATION PROCESS

This application is a continuation of U.S. patent application Ser. No. 09/547,663, filed Apr. 12, 2000.

BACKGROUND OF THE INVENTION

The present invention relates generally to a color hologram display and its fabrication process, and more particularly to a color hologram display wherein a plane pattern such as a plane character or image pattern is superposed and recorded as a hologram on a full-color Lippmann hologram using a three-dimensional object as a subject and its fabrication process.

Never until now is there an entrenched process for incorporating a hologram form of characters, images, etc. in a full-color Lippmann hologram using a three-dimensional model or the like as a three-dimensional subject.

SUMMARY OF THE INVENTION

In view of such situations as experienced in the prior art, an object of the present invention is to provide a color hologram display wherein an image of a three-dimensional object such as a three-dimensional model and a hologram image of a plane pattern such as a character or image pattern are recorded in the same volume hologram photosensitive material in a superposed or multiplexed fashion, and its fabrication process.

According to the present invention, this object is achieved by the provision of a color hologram display comprising a combined reflection and volume type of single layer, wherein a color pattern of plane characters, images or the like and a color three-dimensional subject image are reconstructably recorded while spatially superposed one upon another.

Preferably in this case, the plane color pattern of characters, images or the like is reconstructably recorded in monochrome. In view of viewability, the plane color pattern should be reconstructably recorded in green.

Preferably, the plane shadow of the color pattern of plane characters, images or the like should be reconstructably recorded on a surface different from a surface of the color pattern.

Preferably, the shadow should be reconstructably recorded in a complementary color to a color of the color pattern.

Preferably, the shadow should be reconstructably recorded in front of the color pattern.

Preferably, any shadow of the color pattern of plane characters, images or the like should be unrecorded.

The present invention provides a process of fabricating a color hologram display, wherein a color three-dimensional subject image and a color pattern of plane characters, images or the like are recorded as hologram images in the same photosensitive material.

Preferably in this case, a subject hologram plate for forming a color three-dimensional subject image and a character hologram plate for reconstructing the color pattern of plane characters, images or the like are separately made, said subject hologram plate and said character hologram plate are spatially positioned with a given space located therebetween, and diffracted light from said subject hologram plate and said character hologram plate is simultaneously entered in the same photosensitive material to record said subject and character hologram plates as hologram images.

Preferably, an area of said hologram photosensitive material other than a portion thereof corresponding to said color pattern of plane characters, images or the like is deactivated by photosensitization, and a reflection type hologram of a scatter plate is then recorded in said portion of said hologram photosensitive material to make said hologram plate.

Preferably, said subject hologram plate is recorded in three colors, red, green and blue and said character hologram plate is recorded in any one of red, green and blue. More preferably, said character hologram plate is recorded in green.

Preferably, said character hologram plate for reconstructing said color pattern of plane characters, images or the like is made, said character hologram plate is located in front of a color three-dimensional subject, and diffracted light from said character hologram plate and scattered light from said color three-dimensional subject are simultaneously entered in the same photosensitive material to record said hologram plates as hologram images.

Preferably, a subject hologram plate for forming a color three-dimensional subject image and a character hologram plate for reconstructing a color pattern image of plane characters, images or the like are separately made, said subject hologram plate and said character hologram plate are superposed one upon another, and diffracted light from said subject hologram plate and said character hologram plate is simultaneously entered in the same photosensitive material to record said color three-dimensional subject image and said color pattern image of plane characters, images or the like as hologram images.

The present invention includes a subject hologram plate used to fabricate a color hologram display wherein a subject hologram plate for forming a color three-dimensional subject image and a character hologram plate for reconstructing a color pattern image of plane characters, images or the like are separately made, said subject hologram plate and said character hologram plate are positioned with a given space located therebetween, and diffracted light from said subject hologram plate and said character hologram plate is simultaneously entered in the same photosensitive material to record said color three-dimensional subject image and said color pattern image of plane characters, images or the like as hologram images.

The present invention also includes a subject hologram plate used to fabricate a color hologram display wherein a subject hologram plate for forming a color three-dimensional subject image and a character hologram plate for reconstructing a color pattern image of plane characters, images or the like are separately made, said subject hologram plate and said character hologram plate are superposed one upon another, and diffracted light from said subject hologram plate and said character hologram plate is simultaneously entered in the same photosensitive material to record said color three-dimensional subject image and said color pattern image of plane characters, images or the like as hologram images.

According to the present invention, the color pattern of plane characters, images or the like and the color image of a three-dimensional subject can be reconstructably recorded without crosstalk and unnecessary interference fringes, while they are spatially superposed one upon another. It is thus possible to obtain a color hologram display which enables a bright color subject image and a blur-free, bright color pattern having visibility to be displayed at the same time, and is of great versatility as well. According to the present invention, even when a color pattern of characters, images, etc. is reconstructably incorporated in the hologram for reconstructing the color image of a three-dimensional subject, a bright subject image can be obtained with the same efficiency as that of a pattern-free hologram.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The color hologram display according to the present invention is now explained with reference to its fabrication process.

To fabricate a color hologram display 27' (FIG. 7) according to the present invention, a character hologram plate 1' (FIG. 4) and a subject hologram plate 21' (FIG. 6) must be prepared.

Figure 1:
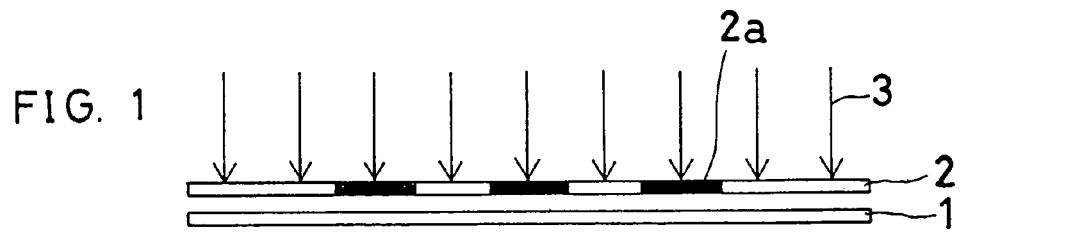
FIG. 1 is a view illustrative of one character hologram plate fabrication step used for the fabrication of the color hologram display according to the present invention.

How to prepare the character hologram plate 1' is first explained. As shown in FIG. 1, a volume hologram photosensitive material 1 such as a photopolymer is first provided as a hologram photosensitive material. Then, a character or image pattern to be displayed on the photosensitive material 1 in a superposed or multiplexed fashion, for instance, a character pattern plate 2 comprising an opaque "ABC" pattern portion 2a and its transparent peripheral portion is placed on the photosensitive material 1, which is then irradiated with light 3 such as ultraviolet light from the character pattern plate 2 side. With the volume hologram photosensitive material 1 irradiated with light 3 through the character pattern plate 2, an area of the photosensitive material 1 other than a portion (1a in FIG. 3) thereof corresponding to the pattern portion 2a remains inert while only the portion 1a corresponding to the pattern portion 2a provides an activated area.

Figure 2:
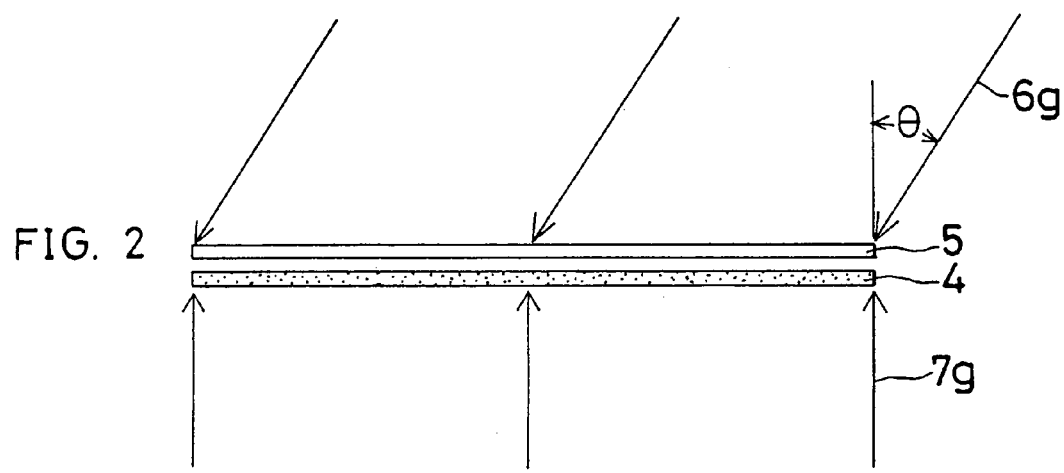
FIG. 2 is a view illustrative of the step of making a reflection type hologram scatter plate used for the character hologram plate fabrication step.

As shown in FIG. 2, on the other hand, a separately provided volume hologram photosensitive material 5 is superposed on a scatter plate 4 such as a ground or opal glass plate. Then, green (G) reference light 6g for instance is entered at a given angle θ of incidence in the volume hologram photosensitive material 5 and, at the same time, green illumination light 7g is entered in the back surface of the scatter plate 4, so that object light transmitted and scattered through the scatter plate 4 and reference light 6g interfere in the volume hologram photosensitive material 5. A reflection type hologram scatter plate 5' (FIG. 3) is thus prepared.

Figure 3:
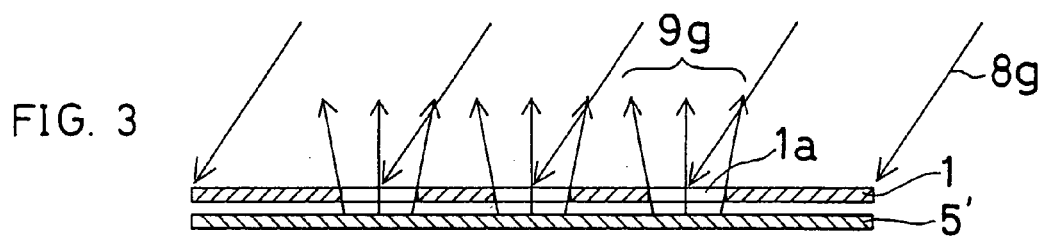
FIG. 3 is a view illustrative of the final step of making the character hologram plate.

Then, as shown in FIG. 3, the volume hologram photosensitive material 1, whose portion other than the character pattern-corresponding portion 1a remains deactivated as shown in FIG. 1, is superposed on the thus prepared reflection type hologram scatter plate 5'. As the volume hologram photosensitive material 1 is irradiated at a given angle of incidence with illumination light 8g having the same wavelength as the reference light 6g used to make the reflection type hologram scatter plate 5', the illumination light 8g transmits through the volume hologram photosensitive material 1 and strikes on the reflection type hologram scatter plate 5' to diffract scattered light 9g in the direction of reflection. The scattered light 9g and incident light 8g interfere in the activated character pattern-corresponding portion 1a of the volume hologram photosensitive material 1, so that a reflective, scattering hologram can be recorded in the character pattern-corresponding portion 1a.

The thus recorded character hologram plate 1' is a reflection type hologram which diffracts green scattered light 11g from only a portion 1'a corresponding to the pattern portion 2a of the character pattern plate 2 in the direction of reflection upon illuminated at around an angle of incidence θ with white light 10w including a green wavelength. In this embodiment, the characters "ABC" can be seen in green.

According to the above embodiment, the character hologram plate 1' may also be made by using a reflection or transmission type scatter plate in place of the reflection type hologram scatter plate 5'. The reflection type scatter plate may be located at the position of the reflection type hologram scatter plate 5' shown in FIG. 3. The transmission type scatter plate may be located at the position of the reflection type hologram scatter plate 5' as shown in FIG. 3 and, at the same time, irradiated with illumination light from behind.

Figure 5:
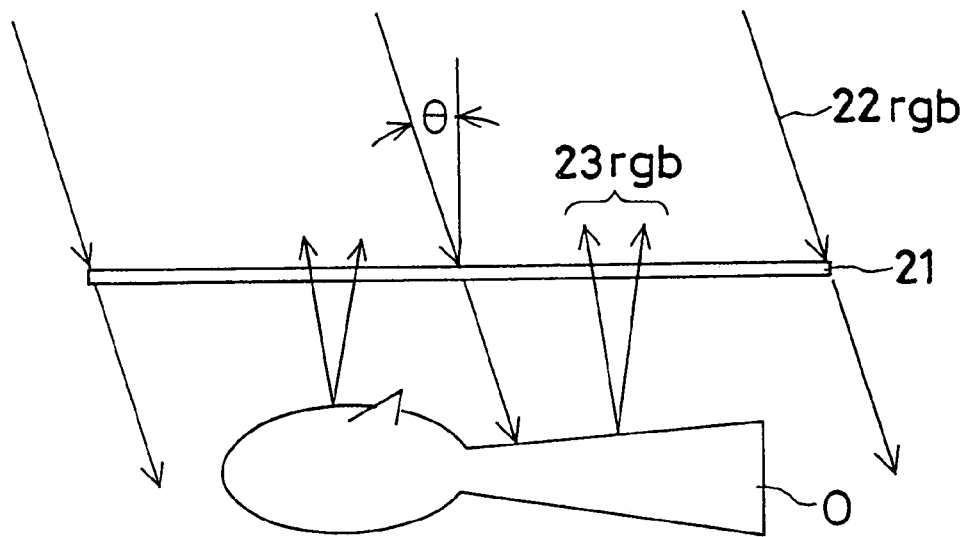
FIG. 5 is a view illustrative of the step of making a subject hologram plate used for the fabrication of the color hologram display according to the present invention.

Next, how to make the subject hologram plate 21' is explained. As shown in FIG. 5, a volume hologram photosensitive material 21 is located away from a three-dimensional subject O such as a three-dimensional model. In this case, a volume hologram photosensitive material having sensitivity with respect to three colors, red, green and blue and capable of multiplex recording is used as the volume hologram photosensitive material 21. However, it is acceptable to use a volume hologram photosensitive material of three-layer construction wherein photosensitive layers sensitive to red, green and blue, respectively, are laminated one upon another. Alternatively, it is acceptable to superpose separately exposed color photosensitive layers.

In such a setting, red light, green light and blue light in the form of illumination light $22rgb$ are entered at an angle of incidence θ in the volume hologram photosensitive material 21 side at the same time or in arbitrary order. Thereupon, the illumination light $22rgb$ transmits through the volume hologram photosensitive material 21 and strikes on the three-dimensional subject O, from which scattered light 23*rgb* is produced in the direction of reflection. The scattered light 23*rgb* and illumination light 22*rgb* interfere in the volume hologram photosensitive material 21, so that a reflection type hologram 21' of the three-dimensional subject O can be recorded in full color (see FIG. 6). This reflection type hologram 21' is used as the subject hologram plate 21'.

Figure 4:
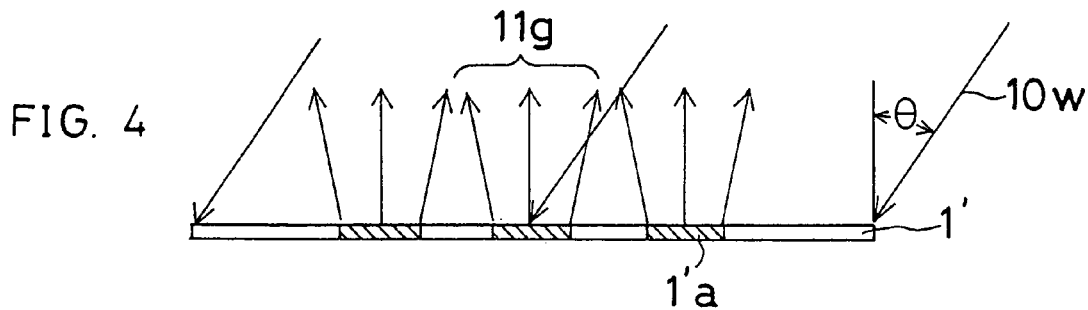
FIG. 4 is a view illustrative of the characteristics of the character hologram plate.
Figure 6:
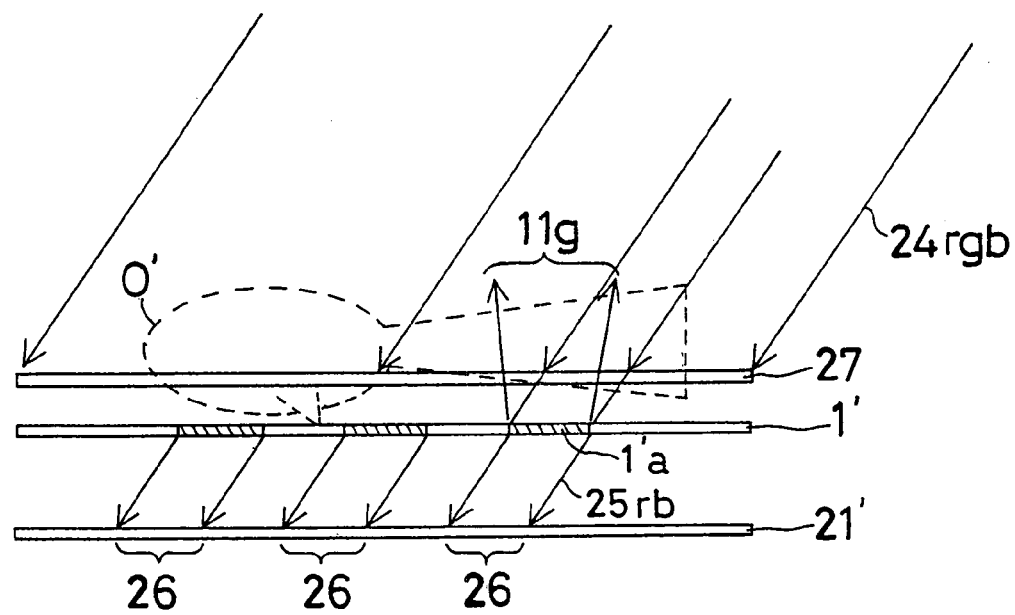
FIG. 6 is a view illustrative of the step of fabricating using both the character hologram plate and the subject hologram for the fabrication of the color hologram display according to the present invention.

Using this subject hologram plate 21' and the character hologram plate 1' of FIG. 4, a color hologram display 27' (see FIG. 7) is fabricated, which reconstructs a character pattern such as a "ABC" pattern in the foreground of a hologram reconstructed image O" of the three-dimensional subject O. To this end, as shown in FIG. 6, another volume hologram photosensitive material 27 is located in the vicinity of the three-dimensional subject O used for recording the subject hologram plate 21' while the character hologram plate 1' is located at a position that is between the subject hologram plate 21' and the volume hologram photosensitive material 27 and that is in front of the position of the three-dimensional subject O located during recording (on the subject hologram plate 21' side) and as close to the volume hologram photosensitive material 27 as possible. In this condition, red light, green light and blue light in the form of illumination light 24*rgb* are allowed to strike simultaneously or in arbitrary order on the volume hologram photosensitive material 27 from the opposite direction to the direction of incidence of the illumination light 22*rgb* used to make the subject hologram plate 21'. Then, the illumination light 24*rgb* transmits through the volume hologram photosensitive material 27 and strikes on the character hologram plate 1', so that green scattered light 11*g* is diffracted from the character pattern portion such as a "ABC" pattern portion 1'*a* (see FIG. 4) in the direction of reflection. The scattered light 11*g* and the green component of illumination light 24*rgb* interfere in the volume hologram photosensitive material 27 so that the character "ABC" pattern can be recorded in the form of a reflection type hologram.

The illumination light 24*rgb* transmits through the volume hologram photosensitive material 27 and the character hologram plate 1' and enters the subject hologram plate 21', where the light 24*rgb* is diffracted in the direction of reflection to reconstruct the real image O' of the recorded three-dimensional subject O in the vicinity of the surface of the volume hologram photosensitive material 27. This diffracted light and illumination light 24*rgb* interfere in the volume hologram photosensitive material 27, so that the hologram image of the three-dimensional subject O can be recorded therein.

Accordingly, the character "ABC" pattern 1'*a* of the character hologram plate 1' and the image O' of the three-dimensional subject O are recorded as a reflection type hologram in the volume hologram photosensitive material 27 while they are kept in the position relation shown in FIG. 6.

It is here noted that when color hologram recording is carried out in such a setting, one pseudoscopic image is recorded. This pseudoscopic image (shadow) is now explained. In FIG. 6, consider that the illumination light 24*rgb* strikes on the pattern portion 1'*a* of the character hologram plate 1'. The hologram recorded in that portion causes the green component (in the above embodiment) to be diffracted as the scattered light 11*g* in the direction of reflection. For this reason, light (component) 25*rb* that transmits through the pattern portion 1'*a* of the character hologram plate 1' without undergoing diffraction is given by the red and blue components of the illumination light 24*rgb*. It is here understood that when the diffraction efficiency of the hologram recorded in the pattern portion 1'*a* is lower than 100%, the light component 25*rb* partially contains the green component. Accordingly, the red and blue components are mainly diffracted from an area 26 where the transmitted light 25*rb* enters the subject hologram plate 21'; that is, the light 25*rb* contains a small amount of the green component to be originally diffracted. As a result, the area 26 corresponding to the shadow of the pattern portion 1'*a* of the character hologram plate 1' on the subject hologram plate 21' is recorded as a pseudoscopic image in the volume hologram photosensitive material 27. The shadow corresponding to the area 26 is recorded as a reflection type hologram while the character "ABC" pattern 1'*a* of the character hologram plate 1' and the image O' of the three-dimensional subject O are kept in the position relation shown in FIG. 6. The image O' is recorded in magenta that is a complementary color to green, i.e., white from which the green component is subtracted.

Figure 7:
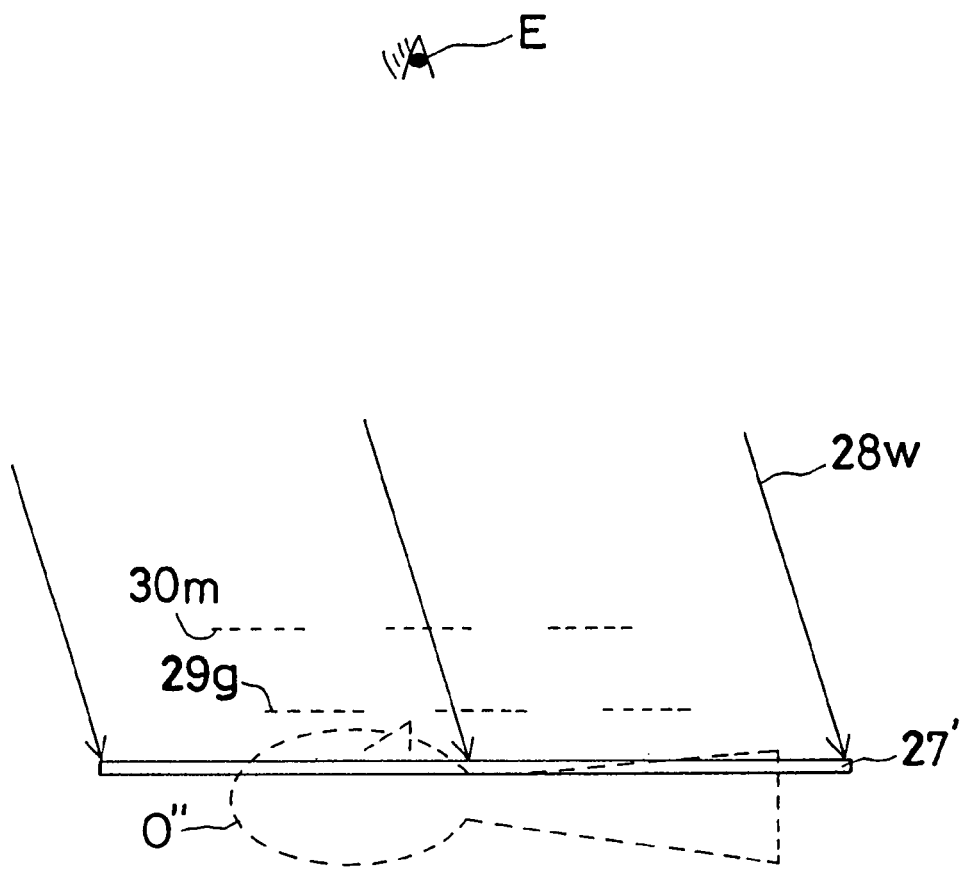
FIG. 7 is a view illustrative of how to reconstruct the image of a three-dimensional subject recorded in the color hologram display according to the present invention.

As mentioned above, the color hologram display 27' is recorded in such a manner that the character pattern, for instance, a character "ABC" pattern 29*g* is reconstructed in the foreground of the hologram reproduced image O" of the three-dimensional subject O. As shown in FIG. 7, white illumination light 28*w* enters the color hologram display 27' from the direction opposite to the direction of incidence of the illumination light 24*rgb* used to record the display 27', whereupon diffracted light reconstructs the color image O" of the three-dimensional subject O in the vicinity of the surface of the color hologram display 27'. At the same time, in front of the color image O" the plane characters "ABC" 29*g* corresponding to the pattern portion 2*a* of the character pattern plate 2 are reconstructed in green and in front thereof the plane, magenta shadow 30*m* of the characters "ABC" is reconstructed. Accordingly, when the observer views the color hologram display 27' through his eyes E, he sees the image 29*g* of the plane, green characters "ABC" just in front of the color image O" of the three-dimensional subject O, as if they were superposed one upon another, and the shadow 30*m* of the plane, magenta characters "ABC" just in front thereof. When the observer moves his eyes E to the left, the character image 29*g* and shadow 30*m* move to the right with respect to the subject image O" so that he can see them in a superposed manner when the direction of observation with his eyes E coincide with the direction of the illumination light 28*w*. At otherwise positions, the character image 29*g* and its shadow 30*m* do not align with each other not only in perspective but in the horizontal direction as well.

Figure 8:
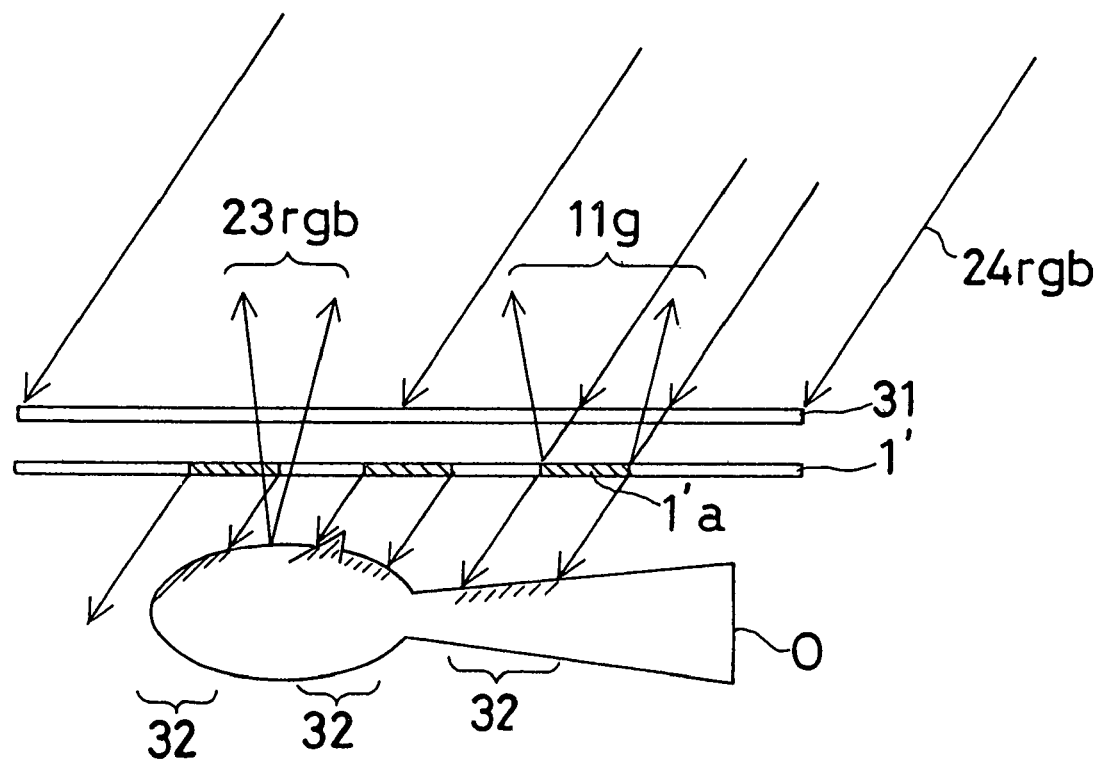
FIG. 8 is a view illustrative of how to fabricate the color hologram display of the present invention directly from the character hologram plate and three-dimensional subject.

The above embodiment is directed to the process of producing the color hologram display 27' of the present invention using the character hologram plate 1' (FIG. 4) and the subject hologram plate 21' (FIG. 6). However, the color hologram display of the present invention may be produced more easily as explained with reference to FIG. 8. As shown in FIG. 8, another volume hologram photosensitive material 31 is located in front of a three-dimensional subject O, and the character hologram plate 1' of FIG. 4 is placed between the volume hologram photosensitive material 31 and the three-dimensional subject O. In this condition, red light, green light and blue light in the form of illumination light 24*rgb* strike simultaneously or in arbitrary order on the volume hologram photosensitive material 31 from the opposite direction to the direction of incidence of the illumination light 8*g* used to make the character hologram plate 1'. Then, the illumination light 24*rgb* transmits through the volume hologram photosensitive material 31 and enters the character hologram plate 1', so that green scattered light 11*g* is diffracted from the character pattern portion such as a "ABC" pattern portion 1'*a* (see FIG. 4) in the direction of reflection. The scattered light 11*g* and the green component of illumination light 24*rgb* interfere in the volume hologram photosensitive material 31 so that the character "ABC" pattern can be recorded in the form of a reflection type hologram. At the same time, the illumination light 24*rgb* transmitting through the volume hologram photosensitive material 31 enters the three-dimensional subject O, so that scattered light 23*rgb* is produced from the subject O in the direction of reflection. This scattered light 23*rgb* and the illumination light 24*rgb* interfere in the volume hologram photosensitive material 32, so that the full-color reflection type hologram of the three-dimensional subject O can be recorded in a multiplex fashion. The thus recorded color hologram display is different from the color hologram display 27' of FIG. 7 in that the shadow of the character pattern portion 1'*a* of the character hologram plate 1' is directly formed as an area 32 on the three-dimensional subject O. Upon reconstruction, this image is formed as a magenta shadow on the surface of the image of the three-dimensional subject O, and therefore the image of the shadow is not recorded in the form of a three-dimensional pseudoscopic image.

In the embodiments explained above, the shadow of the character pattern portion 1'*a* of the character hologram plate 1' is formed three-dimensionally in the space or on the surface side of the hologram reproduced image O'' of the three-dimensional subject O. In what follows, one embodiment of fabricating a color hologram display which, without forming such a shadow, reconstructs characters, etc. in the foreground of the hologram reproduced image O'' of the three-dimensional subject O.

To fabricate a color hologram display 44' (FIG. 11) according to this embodiment, a character hologram plate 41' (FIG. 4) and a subject hologram plate 21' (FIG. 10) must be prepared.

How to prepare the character hologram plate 41' is first explained. The same steps as shown in FIGS. 1 to 3 are used. As shown in FIG. 1, a volume hologram photosensitive material 1 such as a photopolymer is first provided as a hologram photosensitive material. Then, the character or image pattern to be displayed on the photosensitive material 1 in a superposed fashion, for instance, a character pattern plate 2 comprising an opaque "ABC" pattern portion 2*a* and its transparent peripheral portion is placed on the photosensitive material 1, which is then irradiated with light 3 such as ultraviolet light from the character pattern plate 2 side. With the volume hologram photosensitive material 1 irradiated with light 3 through the character pattern plate 2, an area of the photosensitive material 1 other than a portion (1*a* in FIG. 3) corresponding to the pattern portion 2*a* thereof remains inert while only the portion 1*a* corresponding to the pattern portion 2*a* provides an activated area.

As shown in FIG. 2, on the other hand, a separately provided volume hologram photosensitive material 5 is superposed on a scatter plate 4 such as a ground or opal glass plate. Then, green (G) reference light 6*g* for instance is incident at a given angle θ of incidence on the volume hologram photosensitive material 5 and, at the same time, green illumination light 7*g* is incident on the back surface of the scatter plate 4, so that object light transmitted and scattered through the scatter plate 4 and the reference light 6*g* interfere in the volume hologram photosensitive material 5. A reflection type hologram scatter plate 5' (FIG. 3) is thus prepared.

Then, as shown in FIG. 3, the volume hologram photosensitive material 1, whose portion other than the character pattern-corresponding portion 1*a* remains inert as shown in FIG. 1, is superposed on the thus prepared reflection type hologram scatter plate 5'. As the volume hologram photosensitive material 1 is irradiated at a given angle of incidence with illumination light 8*g* having the same wavelength as the reference light 6*g* used to make the reflection type hologram scatter plate 5', the illumination light 8*g* transmits through the volume hologram photosensitive material 1 and strikes on the reflection type hologram scatter plate 5' to diffract scattered light 9*g* in the direction of reflection. The scattered light 9*g* and incident light 8*g* interfere in the activated character pattern-corresponding portion 1*a* of the volume hologram photosensitive material 1, so that a reflective, scattering hologram can be recorded in the character pattern-corresponding portion 1*a*.

The thus recorded character hologram 1' is a reflection type hologram which diffracts green scattered light 11*g* from only a portion 1'*a* corresponding to the pattern portion 2*a* of the character pattern plate 2 in the direction of reflection upon illuminated at around an angle of incidence θ with white light 10*w* having a green wavelength. In this embodiment, a hologram for reconstructing the pattern portion 1'*a* in the air is reproduced from this hologram 1 to make the character hologram plate 41'. To this end, a separately provided volume hologram photosensitive material 41 is located away from this intermediate hologram 1'. The intermediate hologram 1' is irradiated at an angle of incidence θ with the above green illumination light 42*g* via the volume hologram photosensitive material 41, so that scattered light 11*g* diffracted from the intermediate hologram 1' in the direction of reflection and the illumination light 42*g* interfere in the volume hologram photosensitive material 41 to make the character hologram plate 41' (FIG. 10) in the form of a reflection type hologram. It is noted that in the arrangement of FIG. 9, the distance between the intermediate hologram 1' and the volume hologram photosensitive material 41 is shorter than the distance between the three-dimensional object O and the volume hologram photosensitive material 21 in the arrangement of FIG. 5.

On the other hand, the subject hologram plate 21' is prepared as in the first embodiment of the present invention. As shown in FIG. 5, a volume hologram photosensitive material 21 is located away from a three-dimensional subject O such as a three-dimensional model. In this case, a volume hologram photosensitive material having sensitivity with respect to three colors, red, green and blue and capable of multiplex hologram recording is used as the volume hologram photosensitive material 21. However, it is acceptable to use a volume hologram photosensitive material of three-layer construction wherein photosensitive layers sensitive to red, green and blue, respectively, are laminated one upon another. Alternatively, it is acceptable to superpose separately exposed color photosensitive layers.

In such a setting, red light, green light and blue light in the form of illumination light 22*rgb* are allowed to strike at an angle of incidence θ on the volume hologram photosensitive material 21 side at the same time or in arbitrary order. Then, the illumination light 22*rgb* transmits through the volume hologram photosensitive material 21 and enters the three-dimensional subject O, from which scattered light 23*rgb* is produced in the direction of reflection. The scattered light 23*rgb* and illumination light 22*rgb* interfere in the volume hologram photosensitive material 21, so that the reflection type hologram 21' of the three-dimensional subject O can be recorded in full color (see FIG. 10). This reflection type hologram 21' is used as the subject hologram plate 21'.

Figure 9:
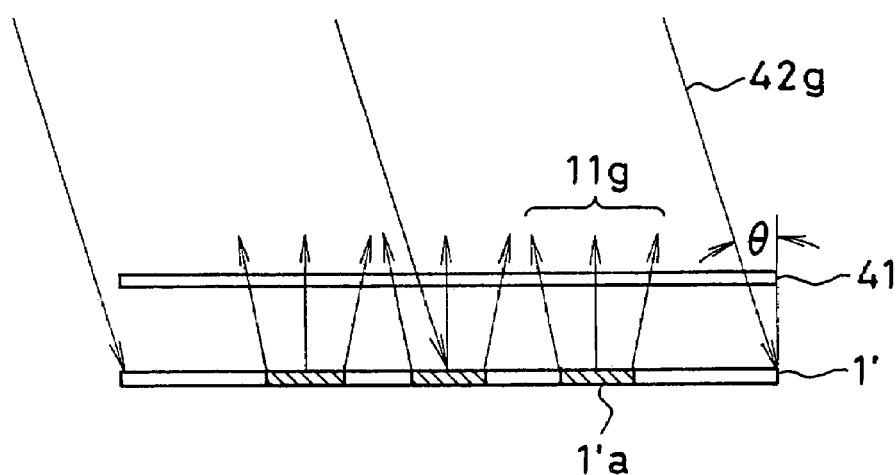
FIG. 9 is a view illustrative of the final step of making the character hologram plate used for the fabrication of a shadow-free color hologram display according to the present invention.
Figure 10:
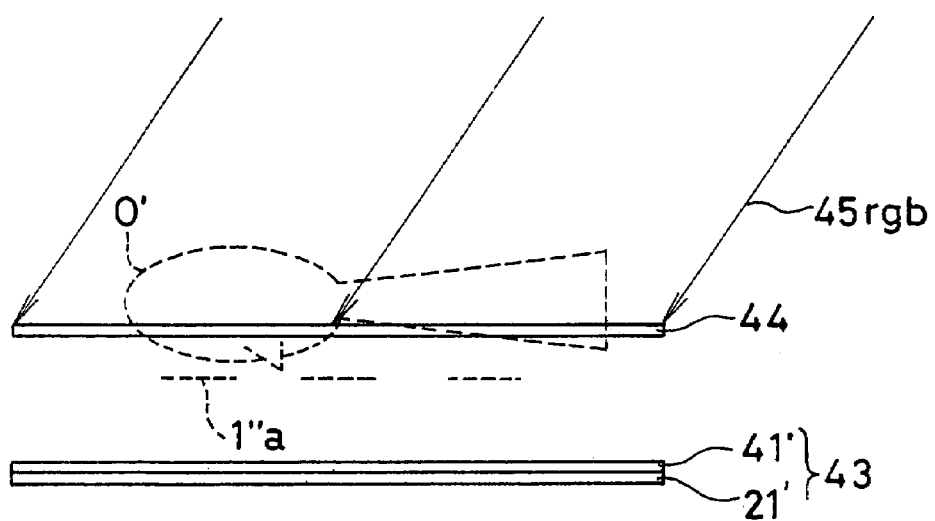
FIG. 10 is a view illustrative of the step of fabricating the shadow-free color hologram display according to the present invention using the character hologram of FIG. 9 and the subject hologram of FIG. 5.

The thus obtained subject hologram plate 21' (FIG. 5) and character hologram plate 41' (FIG. 9) are superposed one upon another with or without a slight distance between them. In view of the order of superposition, it is preferable that the character hologram plate 41' is located on the side of incidence of the illumination light 45*rgb*, as shown in FIG. 10, because characters 47g (FIG. 11) corresponding to the pattern portion 2a of the character pattern plate 2 to be finally reconstructed are brighter.

By superposing the character hologram plate 41' on the subject hologram plate 21' in this way, a hologram plate 43 is obtained. Another volume hologram photosensitive material 44 is then located in the vicinity of the three-dimensional subject O used to record the subject hologram plate 21'. In this condition, red light, green light and blue light in the form of illumination light 45rgb strike simultaneously or in arbitrary order on the volume hologram photosensitive material 44 side from the opposite direction to the direction of incidence of the illumination light 22rgb used to make the subject hologram plate 21'. Then, the illumination light 45rgb transmits through the volume hologram photosensitive material 44 and enters the character hologram plate 41', so that the image 1"a of the plane characters "ABC" corresponding to the pattern 1'a of the intermediate hologram 1' at the time of recording the character hologram plate 41' is reproduced. Further, the illumination light 45rgb enters the subject hologram plate 21', where it is diffracted in the direction of reflection to reconstruct the real image O' of the recorded three-dimensional subject O in the vicinity of the surface of volume hologram photosensitive material 44. Regarding the position relation of the image of 1"a of the characters to the real image O', the distance between the intermediate hologram 1' and the volume hologram photosensitive material 41 when the character hologram plate 41' is made is shorter than the distance between the three-dimensional subject O and the volume hologram photosensitive material 21 when the subject hologram plate 21' is made. As shown in FIG. 10, accordingly, the image 1"a of the characters is formed at a position nearer to the hologram plate 43 side than to the real image O', i.e., in front of the real image O' of the three-dimensional subject O.

The diffracted light from the hologram plate 43 for reproducing the image 1"a of the characters and the real image O' and the illumination light 45rgb interfere in the volume hologram photosensitive material 44, so that the multiplexed image of the three-dimensional subject O and the pattern portion 1'a of the intermediate hologram 1' is recorded in the volume hologram photosensitive material 44. Thus, the image 1"a of the character "ABC" pattern 1'a of the character hologram plate 1' and the image O' of the three-dimensional subject O are recorded as a reflection type hologram in the volume hologram photosensitive material 44 while they remain positioned as shown in FIG. 10.

Figure 11:
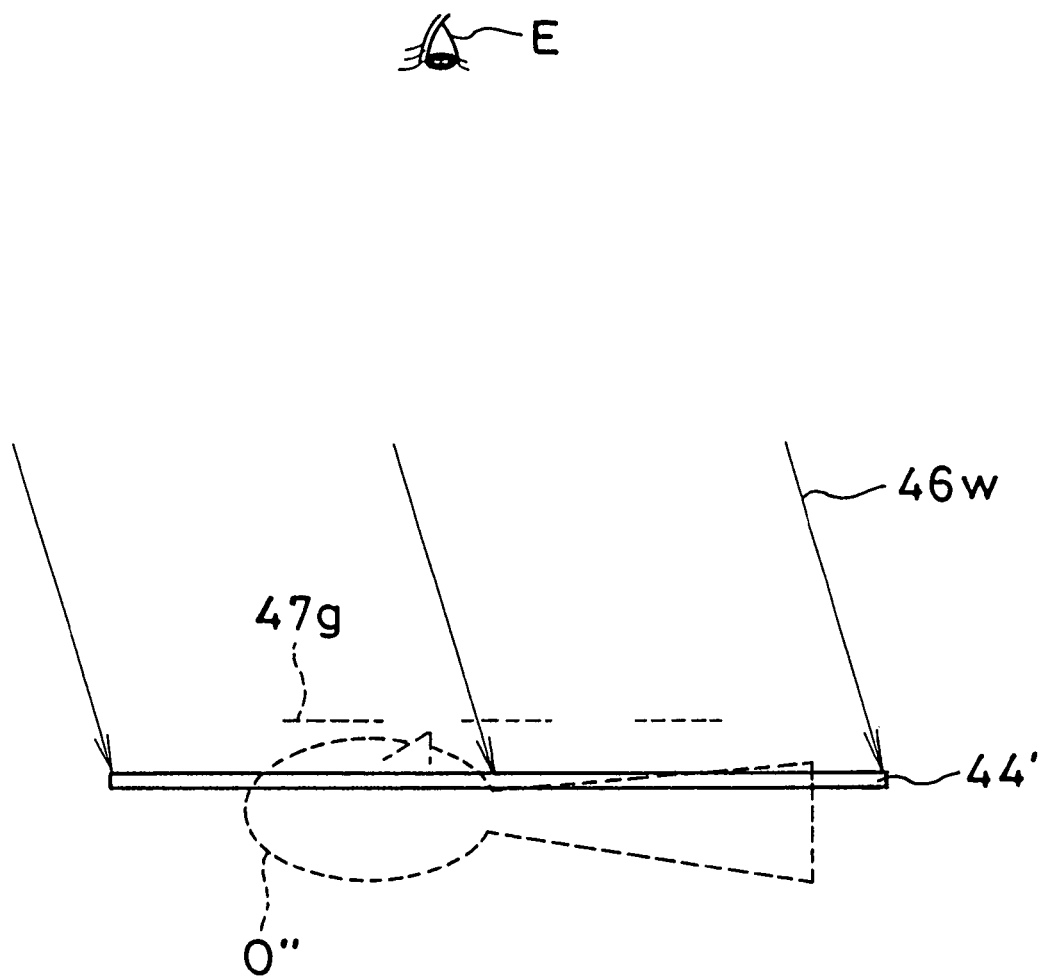
FIG. 11 is a view illustrative of reconstructing the image of the three-dimensional subject recorded in the shadow-free color hologram display according to the present invention.

In this way, a color hologram display 44' is recorded such that the pattern 47g of the characters, e.g., "ABC" can be reconstructed in the foreground of the hologram reproduced image O" of the three-dimensional subject O in a spatially multiplexed manner. As shown in FIG. 11, white illumination light 46w is then allowed to enter the color hologram display 44' from the opposite direction to the direction of incidence of the illumination light 45rgb used to record the display, whereupon the diffracted light reproduces the color image O" of the three-dimensional subject O in the vicinity of the surface of the color hologram display 44' and, in front of the image O", reconstructs the green, plane character "ABC" image 47g corresponding to the pattern portion 1'a of the intermediate hologram 1'. When the observer views them through his eyes E, he can see the plane, green image 47g of the characters "ABC" just in front of the color image O" of the three-dimensional subject O as if they were superposed one upon another. However, it is noted that this embodiment is characterized in that the shadow of the image 47g cannot be seen in every perspective.

While the color hologram display of the present invention has been described with reference to how to fabricate the same, it is understood that the present invention is not limited thereto and so many modifications may be made. It is also understood that the subject hologram plate 21' is not limited to a hologram recorded in such a setting as shown in FIG. 5; holograms, etc. recorded by two-beam interference may be used. To keep the distances between the subject hologram plate 21', character hologram plate 1' and volume hologram photosensitive material 27 at certain values in the setting of FIG. 5, it is desired that hologram recording be carried out while a glass layer having a given thickness is inserted between adjacent members. To reduce the amount of blurring of the character image 29g of FIG. 7 while it is illuminated with white light, it is desired that, in the setting of FIG. 6, the character hologram plate 1' be as close to the volume hologram photosensitive material 27 as possible. A color hologram display may also be holographically reproduced from the color hologram display 27' fabricated as mentioned above while another volume hologram photosensitive material is placed thereon with or without a given distance between them. In the setting of FIG. 9, if the distance between the intermediate hologram 1' and the volume hologram photosensitive material 41 is longer than the distance between three-dimensional subject O and the volume hologram photosensitive material 21 in the setting of FIG. 5, the image 1"a of the characters can then be reconstructed while superposed on the background of the reconstructed image O' of the subject.

According to the color hologram display fabrication process of the present invention as can be understood from the foregoing, the color pattern of plane characters, images or the like and the color image of a three-dimensional subject can be reconstructably recorded without crosstalk and unnecessary interference fringes, while they are spatially superposed one upon another. It is thus possible to obtain a color hologram display which enables a bright color subject image and a blur-free, bright color pattern having visibility to be displayed at the same time, and is of great versatility as well. According to the present invention, even when a color pattern of characters, images, etc. is reconstructably incorporated in the hologram for reconstructing the color image of a three-dimensional subject, a bright subject image can be obtained with the same efficiency as that of a pattern-free hologram.

What we claim is:

1. A process of fabricating a color hologram display, comprising recording a color three-dimensional subject image and a color pattern of plane characters or images as hologram images by exposing a subject hologram plate for forming the color three-dimensional subject image and a character hologram plate for reconstructing the color pattern of plane characters or images, where the two plates are separately made, said subject hologram plate and said character hologram plate are spatially positioned with a given space located there between, and diffracted lights from said subject hologram plate and said character hologram plate are simultaneously entered in a same photosensitive material to record interference patterns for the images and reconstructed pattern of said subject and character hologram plates, with exposing light, as hologram images.

2. The color hologram display fabrication process according to claim 1, wherein an area of a hologram photosensitive material other than a portion thereof corresponding to said color pattern of plane characters or images of the character hologram plate is deactivated by photosensitization, and a reflection type hologram of a scatter plate is then recorded in said portion of said hologram photosensitive material to make said color hologram display.

3. The color hologram display fabrication process according to claim 2, wherein said subject hologram plate is recorded in three colors, red, green and blue and said character hologram plate is recorded in any one of red, green and blue.

4. The color hologram display fabrication process according to claim 3, wherein said character hologram plate is recorded in green.

5. The color hologram display fabrication process according to claim 1, wherein said color three-dimensional subject image is recorded in a subject hologram plate, said subject hologram plate is recorded in three colors, red, green and blue and said color pattern of plane characters or images is recorded in a character plate, said character hologram plate is recorded in any one of red, green and blue.

6. The color hologram display fabrication process according to claim 5, wherein said character hologram plate is recorded in green.

7. A process of fabricating a color hologram display as recited in claim 1, comprising the steps of employing a subject hologram plate for forming a color three-dimensional subject image and a character hologram plate for reconstructing a color pattern image of plane characters or images, wherein said subject hologram plate and said character hologram plate are separately made, superposing said subject hologram plate and said character hologram plate one upon another, and providing diffracted light from said subject hologram plate and said character hologram plate to simultaneously enter in the same photosensitive material to record said color three-dimensional subject image and said color pattern image of plane characters or images as hologram images.

8. The color hologram display fabrication process according to claim 1, wherein said subject hologram plate is recorded in three colors, red, green and blue and said character hologram plate is recorded in any one of red, green and blue.

9. The color hologram display fabrication process according to claim 8, wherein said character hologram plate is recorded in green.

10. A process of fabricating a color hologram display, comprising recording a color three-dimensional subject image and a color pattern of plane characters or images as hologram images by exposing a character hologram plate for reconstructing said color pattern of plane characters or images, said character hologram plate is located in front of a color three-dimensional subject, and diffracted light from said character hologram plate and scattered light from said color three-dimensional subject are simultaneously entered in the same photosensitive material to record interference patterns for the subject image and reconstructed pattern of said character hologram plates, with exposing light, as hologram images.

11. A color hologram display comprising a combined reflection type hologram and volume type hologram, said volume type hologram being of single layer or multilayer photosensitive layer construction, wherein a color pattern of plane characters or images and a color three-dimensional subject image are reconstructably recorded therein while spatially superposed one upon another, wherein any shadow of said color pattern of plane characters or images is unrecorded, fabricated by the process of claim 10.

12. A hologram plate used to fabricate a color hologram display, comprising a photosensitive material, a color three-dimensional subject image and a color pattern image of plane characters or images, wherein a subject hologram plate for forming the color three-dimensional subject image and a character hologram plate for reconstructing the color pattern image of plane characters or images are separately made, said subject hologram plate and said character hologram plate are positioned with a given space located therebetween, and diffracted light from said subject hologram plate and said character hologram plate is simultaneously entered in said photosensitive material to record said color three-dimensional subject image and said color pattern image of plane characters or images as hologram images.

13. The hologram plate according to claim 12, wherein an angle of incidence of light employed to produce said diffracted light from said subject hologram plate and said character hologram plate is equal.

14. A hologram plate used to fabricate a color hologram display, comprising a photosensitive material, a color three-dimensional subject image and a color pattern image of plane characters or images, wherein a subject hologram plate for forming the color three-dimensional subject image and a character hologram plate for reconstructing the color pattern image of plane characters or images are separately made, said subject hologram plate and said character hologram plate are superposed one upon another, and diffracted light from said subject hologram plate and said character hologram plate is simultaneously entered in said photosensitive material to record said color three-dimensional subject image and said color pattern image of plane characters or images as hologram images.

15. The hologram plate according to claim 14, wherein an angle of incidence of light employed to produce said diffracted light from said subject hologram plate and said character hologram plate is equal.

* * * * *